United States Patent
Groenewegen et al.

(10) Patent No.: US 7,794,311 B2
(45) Date of Patent: Sep. 14, 2010

(54) METHOD AND APPARATUS FOR CLEANING CARCASSES

(75) Inventors: Carl Groenewegen, Liberty Township, OH (US); Dan L. Porter, Batavia, OH (US); Kenneth J. Roach, Liberty Township, OH (US)

(73) Assignee: Diversey, Inc., Sturtevant, WI (US)

( * ) Notice: Subject to any disclaimer, the term of this patent is extended or adjusted under 35 U.S.C. 154(b) by 0 days.

(21) Appl. No.: 12/407,464

(22) Filed: Mar. 19, 2009

(65) Prior Publication Data

US 2009/0239458 A1     Sep. 24, 2009

Related U.S. Application Data

(60) Provisional application No. 61/038,254, filed on Mar. 20, 2008.

(51) Int. Cl.
A22C 21/00    (2006.01)

(52) U.S. Cl. .................................................... 452/173

(58) Field of Classification Search ......... 452/177–183, 452/198
See application file for complete search history.

(56) References Cited

U.S. PATENT DOCUMENTS

| | | | |
|---|---|---|---|
| 1,537,846 A | 5/1925 | McKenzie | |
| 2,015,058 A | 9/1935 | Bruce | |
| 2,058,976 A * | 10/1936 | Gray | 141/125 |
| 2,492,387 A | 12/1949 | Lundell | |
| 2,652,589 A | 9/1953 | Spooner | |
| 2,850,761 A | 9/1958 | Jonsson | |
| 2,976,983 A | 3/1961 | Zebarth | |
| 4,133,098 A * | 1/1979 | Brook | 209/565 |
| 4,944,068 A | 7/1990 | Covell, III | |
| 4,947,518 A | 8/1990 | Covell, III | |
| 5,042,540 A * | 8/1991 | Gorlich | 141/174 |
| 5,725,082 A * | 3/1998 | Connell | 198/471.1 |
| 5,939,115 A | 8/1999 | Kounev et al. | |
| 6,146,262 A * | 11/2000 | Long et al. | 452/141 |
| 6,206,773 B1 * | 3/2001 | Waits | 452/141 |
| 6,475,076 B1 * | 11/2002 | Rheingans et al. | 452/167 |
| 6,547,659 B1 | 4/2003 | Adachi et al. | |
| 6,669,546 B2 * | 12/2003 | Long | 452/141 |
| 7,011,575 B2 * | 3/2006 | Smarsh | 452/141 |
| 7,134,956 B2 | 11/2006 | Lee | |

* cited by examiner

Primary Examiner—Thomas Price
(74) Attorney, Agent, or Firm—Gregory S. Bollis

(57) ABSTRACT

Various carcass cleaning apparatuses and methods are described and illustrated, wherein carcasses can be cleaned by at least partially immersing carcasses within reservoirs moved by a conveyor. The reservoirs can be filled with cleaning fluid, receive carcasses to immerse the carcasses in the fluid, and can then be drained of such fluid, wherein the drained fluid can be collected, filtered, and supplied again to reservoirs for immersing and cleaning additional carcasses.

20 Claims, 6 Drawing Sheets

METHOD AND APPARATUS FOR CLEANING CARCASSES

BACKGROUND

Carcass cleaning systems for automated or semi-automated cleaning of chicken, turkey, pig, hog, cattle, and other animal carcasses have been in use for many years. A long-standing practice of cleaning many types of animal carcasses is to convey such carcasses into and out of a dip tank containing cleaning fluid. In the interests of insuring that cleaning systems using such dip tanks continue to properly clean carcasses dipped therein, conventional practice is to drain such dip tanks after a period of time or after a threshold number of carcasses have been dipped, and then to re-fill such dip tanks with new cleaning fluid.

However, the opportunity to operate cleaning systems using these dip tanks after the cleaning fluid has become unacceptably dirty still exists. The likelihood of operating dip tanks after cleaning fluid has become unacceptably dirty is increased by the operating costs of such systems. For example, the costs of disposing cleaning fluid in dip tanks, and then replacing the disposed fluid with new cleaning fluid can represent a large portion of the operating costs of a carcass cleaning system. Therefore, incentives inherently exist for operators of such systems to delay the replacement of cleaning fluid in carcass cleaning dip tanks, resulting in a greater potential for cleaned carcasses failing to meet heath and safety standards.

Accordingly, in light of these and other challenges regarding the design and operation or conventional carcass cleaning systems, improved carcass cleaning systems continue to be welcome in the art.

SUMMARY

In some embodiments according to the present invention, a carcass cleaning apparatus is provided, and comprises a first conveyor movable to transport carcasses; a plurality of fluid reservoirs each shaped to retain a quantity of fluid; and a second conveyor movable to transport the plurality of reservoirs, wherein the first and second conveyors are movable with respect to one another to at least partially immerse a different carcass conveyed by the first conveyor into each reservoir moved by the second conveyor.

Some embodiments of the present invention provide a carcass cleaning system, comprising a plurality of reservoirs each shaped to retain a quantity of fluid; a conveyor coupled to the plurality of reservoirs and movable to transport the plurality of reservoirs along a path; and a fluid line positioned to fill the plurality of reservoirs in at least one location along the path; wherein each reservoir has a first state in which the reservoir retains a respective quantity of fluid within which at least one carcass is received, and a second state in which the reservoir is substantially drained of fluid.

In some embodiments according to the present invention, a method of cleaning carcasses is provided, and comprises moving a carcass along a first path; moving a reservoir along a second path; at least partially filling the reservoir with fluid; inserting the carcass into fluid within the reservoir; removing the carcass from the reservoir; emptying the reservoir of the fluid; filtering the fluid to produce a filtered fluid; and repeating both moving, at least partially filling, inserting, removing, and emptying steps with the filtered fluid for another carcass.

Other aspects of the invention will become apparent by consideration of the detailed description and accompanying drawings.

DETAILED DESCRIPTION

Before any embodiments of the present invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description, and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
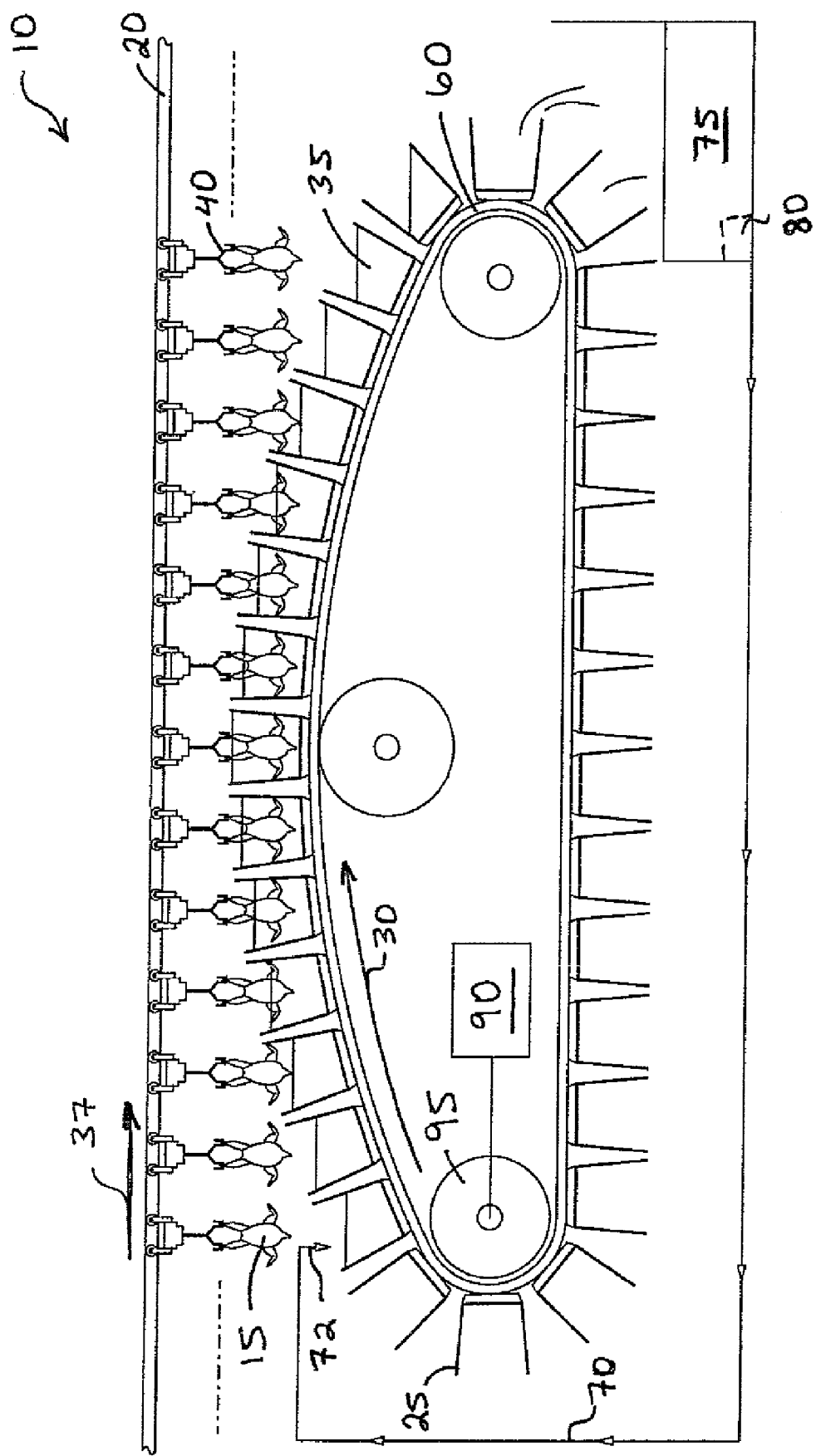
FIG. 1 is a side view of a carcass cleaning system according to an embodiment of the present invention.
Figure 2:
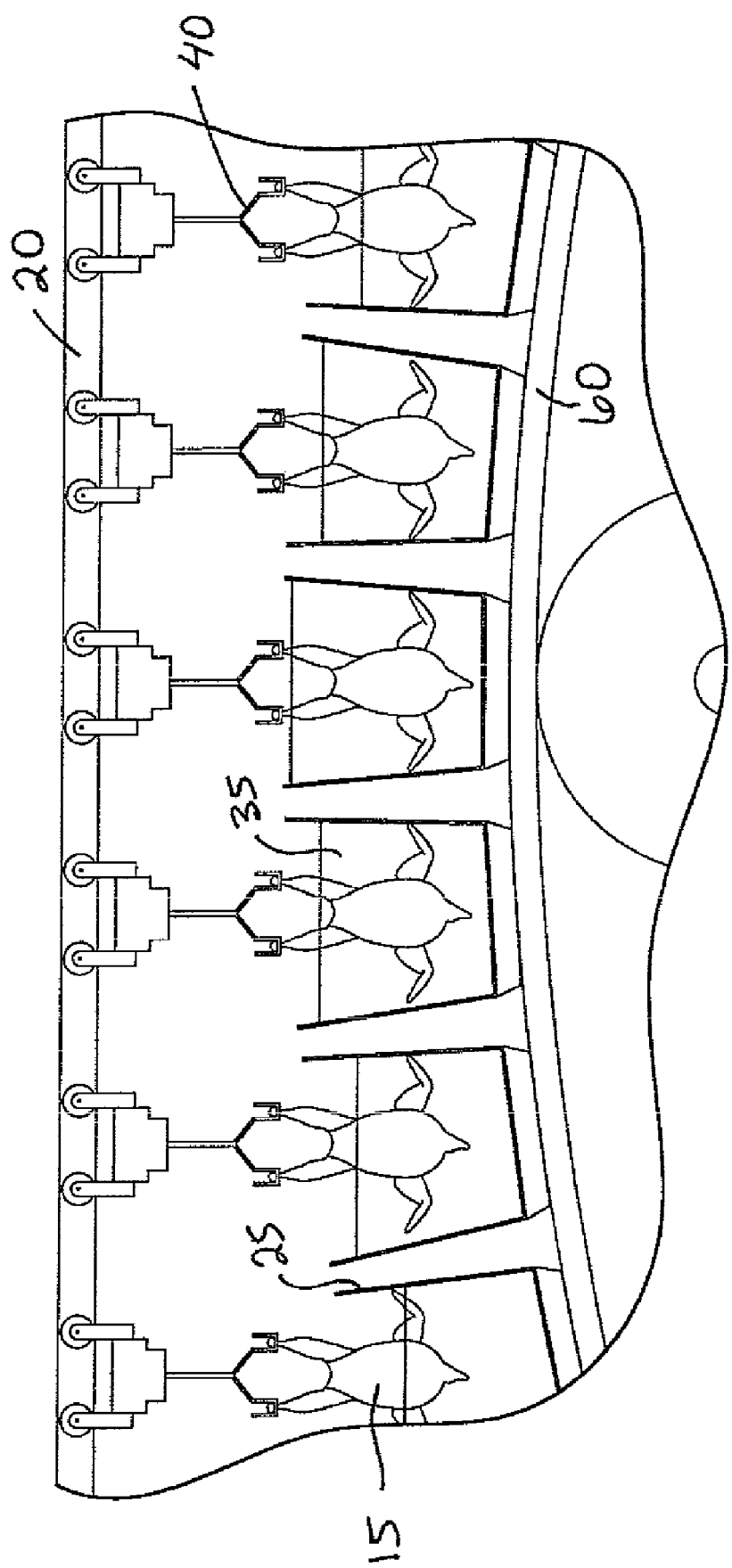
FIG. 2 is a detail view of the carcass cleaning system of FIG. 1.
Figure 3:
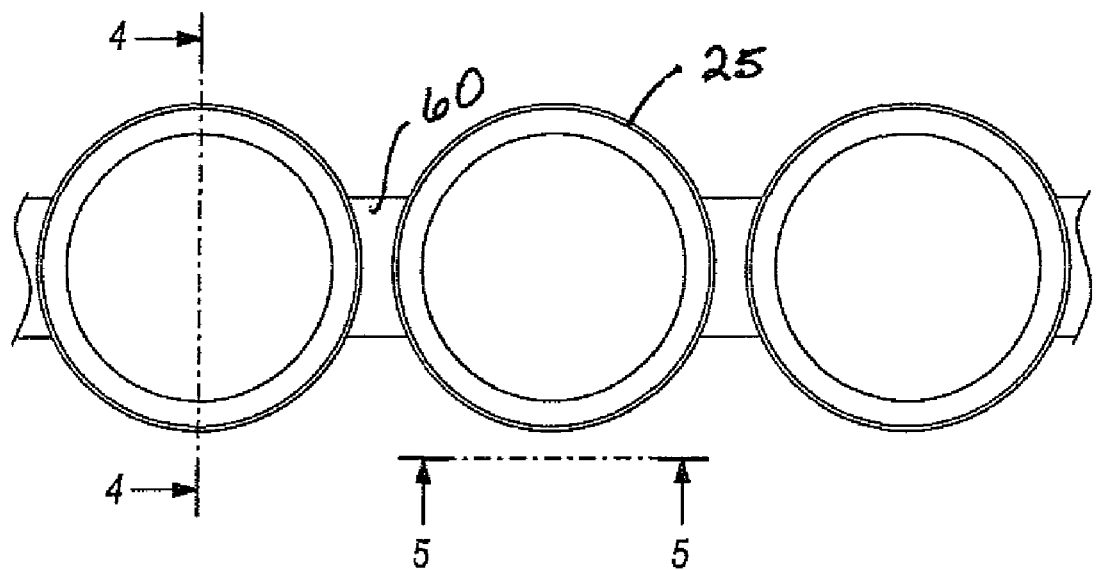
FIG. 3 is a top view of a number of reservoirs of a carcass cleaning system according to an embodiment of the present invention.

A carcass cleaning system according to an embodiment of the present invention is illustrated in FIGS. 1 and 2, and is indicated generally at 10. Any of the carcass cleaning systems described and/or illustrated herein can be used as a part of a larger on-line carcass processing system and/or a carcass chiller processing stage. Such a carcass processing system operates to immerse carcasses 15 in a fluid bath to remove bacteria, viscera remains, fecal matter etc. from the inside and outside of the carcasses 15. The carcasses 15 shown in FIGS. 1 and 2 are chicken carcasses, although it will be appreciated that the carcass cleaning system can be used to clean carcasses of any animal, including without limitation turkeys and other poultry, pigs, hogs, cattle, and the like.

Carcasses entering the carcass cleaning system according to any of the embodiments of the present invention can be processed in a number of different manners. For example, in those embodiments in which the carcass cleaning system 10 is used to clean chickens, the carcasses can enter the system 10 after being plucked and eviscerated.

The illustrated carcass cleaning system 10 of FIGS. 1 and 2 includes a first conveyor 20 along which carcasses 15 are conveyed along a first travel path 37, a second conveyor 60, and a number of individual reservoirs 25 moveable by the second conveyor 60 along a second travel path 30. As described in greater detail below, each of the carcasses 15 passing through the carcass cleaning system 10 is at least partially received within one of the reservoirs 25 moved by the second conveyor 60. In doing so, each carcass 15 is at least partially immersed in cleaning fluid in the reservoir 25 in which the carcass 15 is received.

Figure 7:
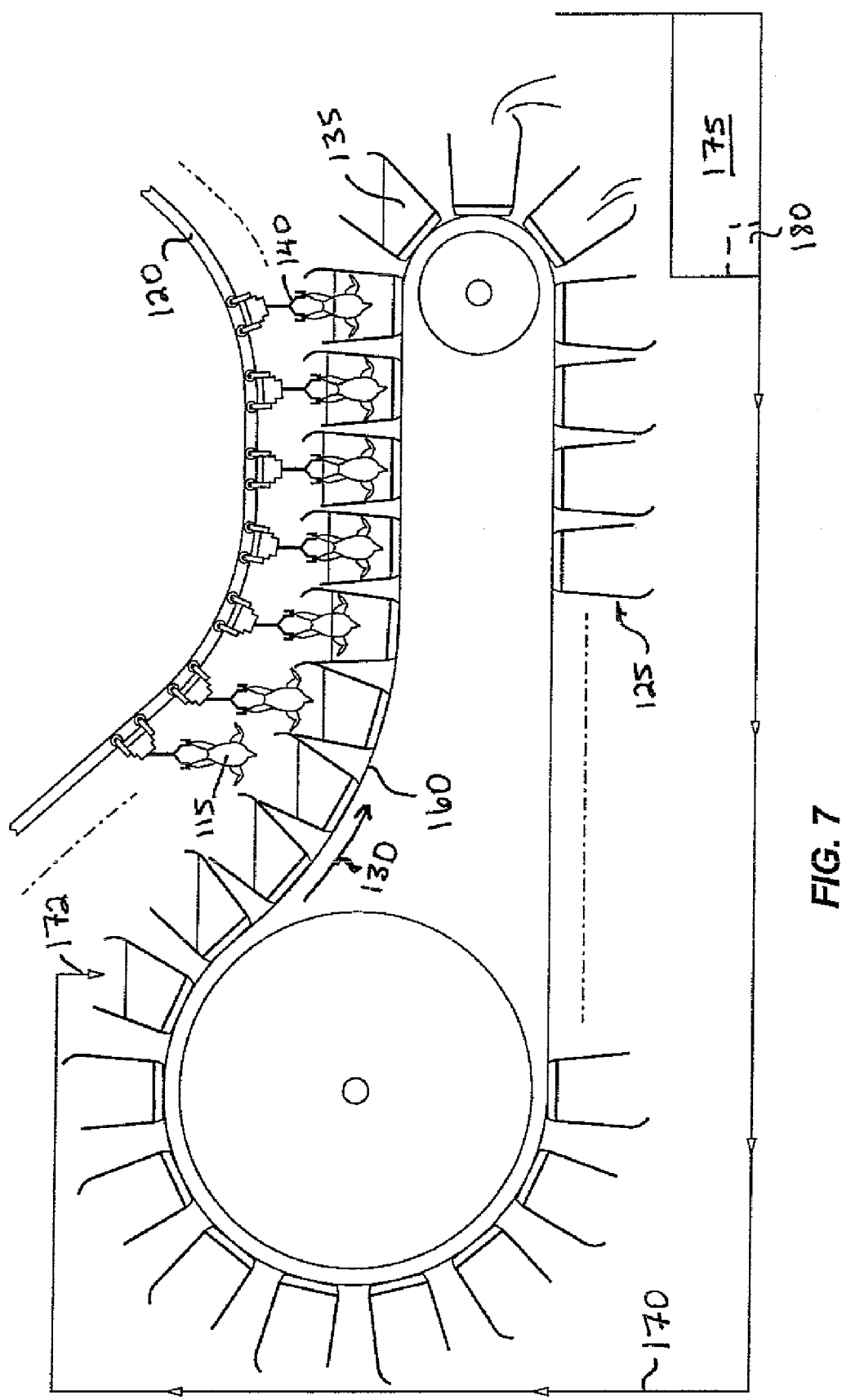
FIG. 7 is a side view of a carcass cleaning system according to another embodiment of the present invention, using reservoirs of the type shown in FIG. 6.
Figure 8:
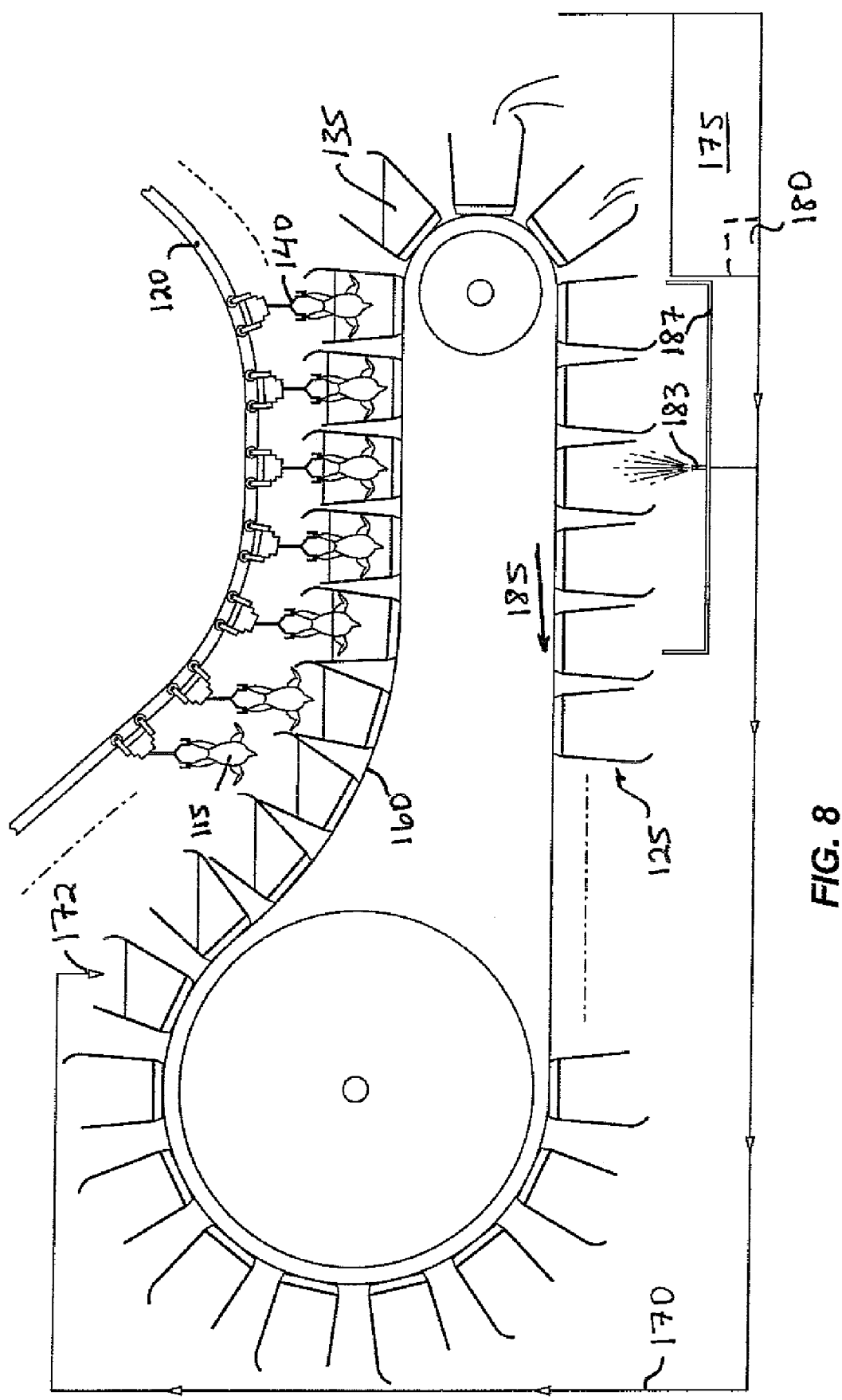
FIG. 8 is a side view of a carcass cleaning system according to yet another embodiment of the present invention.

The first conveyor 20 illustrated in FIGS. 1 and 2 can take a number of different forms, such as a rail, cable, or chain conveyor from which carcasses 15 are suspended in any suitable manner. The first conveyor 20 can travel along a straight path, a zigzag path, a serpentine or other curved path, or any combination thereof along various portions of its length. Also, the first conveyor 20 can extend at a constant or substantially constant elevation along the carcass cleaning system 10, or can change in elevation along any portion of the carcass cleaning system 10. In the embodiment shown in FIGS. 1 and 2, the first conveyor 20 travels along a vertically consistent path, but may have a changing horizontal position, even though such a path is not illustrated in FIGS. 1 and 2. For example, the embodiments of FIGS. 7 and 8 illustrate a travel path extending through different heights. It should be noted that in any of the embodiments described herein, the travel path 37 of the first conveyor 20 and/or the travel path 30 of the second conveyor 60 can vary in elevation in order to bring carcasses 15 into fluid within the reservoirs 25.

By way of example only, the carcasses 15 illustrated in FIGS. 1 and 2 are suspended by shackles 40 coupled to and movable along a rail (collectively referred to herein as the first conveyor 20). However, any other type of conveyor suitable for moving carcasses 15 can instead be used, and falls within the spirit and scope of the present invention.

After the carcasses 15 have traveled along the illustrated carcass cleaning system 10, the carcasses 15 can be removed from the shackles 40, and can be individually placed into a chiller or can remain on the shackles 40 while in the chiller. After the chiller, the carcasses 15 can be separated into pieces if desired, or can be left as one part and then packaged for shipping and consumption.

The reservoirs 25 can have any shape and size desired, and can have a shape and size adapted for the types of carcasses 15 introduced into the reservoirs 25. The reservoirs 25 can comprise polymeric material, metal, composite material, other materials, or any combination thereof. An example of a reservoir 25 is illustrated in FIGS. 1-5. The reservoirs 25 of the embodiment illustrated in FIGS. 1-5 each have a substantially cylindrical shape with a top end 45 and a bottom end 50 (in one orientation of the reservoirs 25). In other, non-illustrated embodiments, the reservoir has any other type of rotund shape (e.g., ovular or elliptical in vertical and/or horizontal cross section with respect to the orientation shown in FIGS. 4 and 5), a substantially conical shape, a substantially cubic or other parallelepiped shape, and the like. Other reservoir shapes are possible and are considered to be within the scope of the present invention. For example, irregular reservoir shapes can be utilized as desired, some of which are described in greater detail below.

Figure 4:
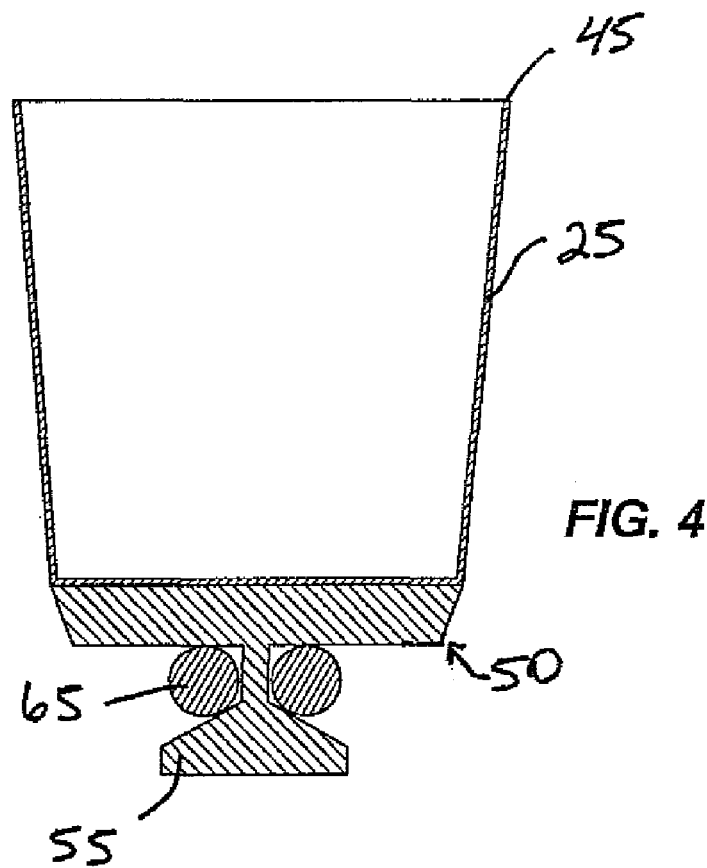
FIG. 4 is a cross-sectional side view of a reservoir shown in FIG. 3, taken along line 4-4 of FIG. 3, and further showing the relationship between the reservoir and a conveyor.
Figure 5:
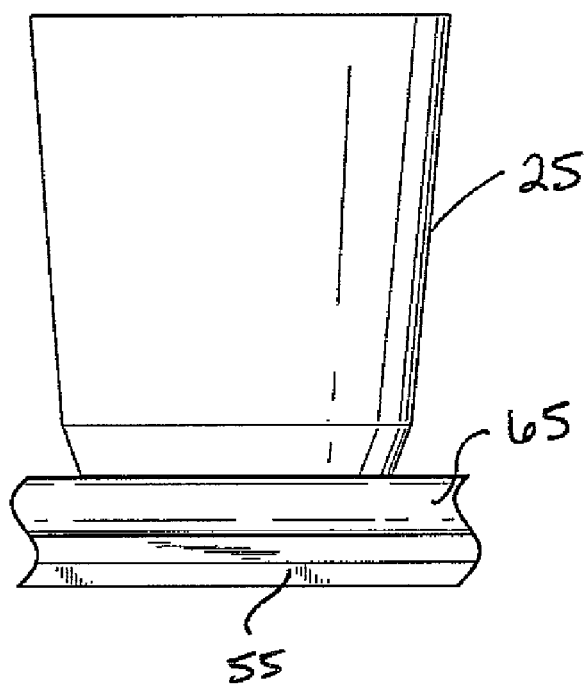
FIG. 5 is a side view of the reservoir and conveyor of FIG. 3.

With continued reference to the reservoirs 25 illustrated in FIGS. 1-5, the top end 45 of each reservoir 25 is open to receive a quantity of fluid 35, whereas the bottom end 50 is adapted to engage the first conveyor 20. In the illustrated embodiment, the bottom end 50 includes a separate element that can be coupled to or molded with the reservoir 25. The illustrated reservoirs 25 each include an elongated protrusion 55 that is engageable with the second conveyor 60 as shown in FIGS. 4 and 5. The second conveyor 60 can include rails 65 or other members shaped to permit sliding, rolling, or other movement of the reservoirs 25 along the second conveyor 60. The rails 65 can engage the protrusions 55 of the reservoirs 25 to guide the reservoirs 25 along the second conveyor 60. In some embodiments, the second conveyor 60 is stationary, but engages the reservoirs 25 to allow movement of the reservoirs 25 along the travel path 30. In other embodiments, the reservoirs 25 are coupled to the second conveyor 60 for movement with the second conveyor 60 along the travel path 30. In such embodiments, a separate frame member (not shown) or other suitable structure can be included to support the moveable second conveyor 60.

In some embodiments, fluid is supplied to the reservoirs 25 to at least partially fill the reservoirs 25 for partial or total immersion of carcasses 15 therein. Fluid can be supplied to the reservoirs 25 via a pipe, hose, tube, or other conduit 70, can be supplied by a tank or other reservoir positioned adjacent the passing reservoirs 25, or in any other manner desired. In the illustrated embodiment of FIGS. 1 and 2, for example, a conduit 70 extends to a portion of the second conveyor 60 and is oriented to direct a flow of fluid 35 into the reservoirs 25 as the reservoirs 25 pass under a conduit outlet 72. The fluid 35 can be dispensed into each reservoir 25 in turn, as the reservoirs 25 move along the second conveyor 60. In this regard, the second conveyor 60 can be repeatedly stopped or slowed in a position permitting fluid from the conduit outlet 72 to fill each reservoir to a desired level. For example, the reservoirs 25 can be advanced a set distance along the second conveyor 60, can then be stopped for a set period of time or until a predetermined amount of fluid is dispensed from the fluid outlet 72, and can then be advanced another set distance. In other embodiments, the second conveyor 60 does not stop or slow for the purpose of receiving fluid 35.

In any of the embodiments described herein, fluid 35 can be supplied from the conduit outlet 72 in an uninterrupted manner as reservoirs 25 pass the conduit outlet 72, or the flow of fluid 35 can slow or be stopped between passing reservoirs 25. In those embodiments in which fluid flow is controlled to correspond to the position of one or more reservoirs 25, fluid 35 can be dispensed from the conduit outlet 72 only when a reservoir 25 is positioned to receive the fluid 35. In such embodiments, a sensor, timer, or other device capable of coordinating the positions of the reservoirs 25 with the flow of fluid 35 can be used. A valve can also be included to permit or inhibit the flow of fluid 35 through the conduit outlet 72. The sensor, timer, or other device can sense or otherwise determine when a reservoir 25 is properly positioned to receive fluid 35 from the conduit outlet 72, at which time the valve can be operated to permit flow of fluid 35 into the reservoir 25. Further, the sensor, timer, or other device can sense or otherwise determine when a reservoir 25 is not positioned to receive fluid 35 from the conduit outlet 72, at which time the valve can be closed to inhibit the flow of fluid 35 from the conduit outlet 72.

Any cleaning fluid can be used to clean the carcasses 15. By way of example only, the fluid can be or include water, hypochlorite, chlorine dioxide, chlorous acid, acidified hypochlorite, acidified sodium chlorite, organic acids, peracetic acid, other peracids, trisodium phosphate, and mixtures and combinations thereof. Other fluids or combinations of fluids can also be used, either in lieu of or in addition to any or all of such fluids.

Reservoirs 25 can be located in any regular or irregular positions along the second conveyor 60, and can be fixed in position with respect to one another or be movable to different distances with respect to one another. In some embodiments, the reservoirs 25 are positioned adjacent one another along the second conveyor 60 to catch fluid 35 without substantial spillage and without requiring a slow or stoppage of fluid flow or reservoirs 25. Therefore, as the fluid 35 is dispensed from the conduit outlet 72, the fluid 35 can be primarily or exclusively dispensed into one of the reservoirs 25 with little or no fluid 35 flowing past the reservoirs 25 onto a floor or other surface.

Fluid 35 failing to enter or be retained in the reservoirs 25 be collected in a number of manners known to those in the art. For example, in some embodiments, a receiving tank, collecting pan, or other sump (not shown) can be provided below the conduit outlet 72 to receive fluid 35 spilled from the reservoirs 25 or missing the reservoirs 25.

After a reservoir 25 in the illustrated embodiment of FIGS. 1-5 is at least partially filled with fluid 35, a carcass 15 is inserted into the respective reservoir 25 and is at least partially or fully submerged in the fluid 35. The carcass 15 can be kept at least partially submerged in the fluid 35 for a sufficient period of time to clean the inner and outer surfaces of the carcass 15. In some embodiments, the carcass 15 is immersed in an inverted orientation, such that the inside of the carcass 15 is immersed until fluid 35 pours into the carcass 15 to at least partially fill the inside of the carcass 15 with the fluid 35. The reservoir 25 can be dimensioned to at least partially receive the carcass 15 and fluid 35 displaced thereby upon insertion of the carcass 15 within the reservoir 25 without spilling or substantial spillage of fluid 35 from the reservoir 25.

For example, in chicken carcass cleaning applications, about five liters of fluid 35 can be dispensed into each reservoir 25, and each reservoir 25 can be capable of holding about ten liters of fluid 35. The carcass 15 can displace the fluid 35 such that about five liters of fluid 35 and the carcass 15 can substantially fill a ten-liter reservoir 25. In other embodiments, more or less fluid 35 can be dispensed into each reservoir 25, and/or the reservoirs 25 can hold more or less fluid 35.

As carcasses 15 travel along the first conveyor 20 and reservoirs 25 travel along the second conveyor 60, the carcasses 15 are immersed into the fluid 35, and are then withdrawn from the fluid 35, as illustrated in FIG. 2. After the carcasses 15 are withdrawn from their respective reservoirs 25, the fluid 35 is poured out of each reservoir 25 into a sump 75. The sump 75 can be any tank or container operable to receive a quantity of fluid 35 from the reservoirs 25. In some embodiments, the sump 75 is the same element or structure used to capture and/or collect fluid 35 spilled as the reservoirs 25 are filled as described above. In other embodiments, such spilled fluid is collected by a separate sump, and can be re-circulated back into the reservoirs 25 regardless of whether fluid 34 in which carcasses 15 are immersed is re-circulated to the reservoirs 25 as described below.

Some embodiments of the sump 75 can have a screen or other fluid-permeable cover to inhibit foreign particles from entering the sump 75. In other embodiments, the sump 75 has an open top portion to freely receive any fluid 35 and particles from the reservoirs 25. The sump 75 can have any shape and size suitable for receiving fluid 35 from the reservoirs 25.

In some embodiments, the sump 75 can further include or be connected to at least one filter 80 and/or one or more fluid processing devices (not shown). The filter 80 can filter particles and/or bacteria out of the fluid 35. In some embodiments, fluid 35 that has been received within the sump 75 and that has passed through any filters 80 or fluid processing devices as described above can be re-circulated (e.g., through conduit 70 and conduit outlet 72) back into the reservoirs 25.

With continued reference to the illustrated embodiment of FIGS. 1-5, carcasses 15 travel along the first conveyor 20 at approximately the same rate as the reservoirs 25 travel along the second conveyor 60. In some embodiments, this common or similar speed can be maintained for at least the distance in which the carcasses 15 are received in the reservoirs 25. In some embodiments, the carcasses 15 push against the reservoirs 25 to move the reservoirs 25 along the second conveyor 60. In other embodiments, the reservoirs 25 pull the carcasses 15 along the first conveyor 20. In still other embodiments, the carcasses 15 are driven along the first conveyor 20 and the reservoirs 25 are driven by the second conveyor 60 without significant driving motion transferred between conveyors 20, 60.

In some embodiments, the second conveyor 60 is driven by a power source 90 that rotates a sprocket, drum, pulley, wheel, or other rotating element (hereinafter referred to as a drive wheel 95). The drive wheel 95 can be coupled to the second conveyor 60 such that the reservoirs 25 are propelled along the second conveyor 60 in response to rotation of the drive wheel 95. In some embodiments, the first conveyor 20 is driven by the power source 90 and at least one drive wheel 95. In other embodiments, the first and second conveyors 20, 60 are driven by a common power source 90 connected to both conveyors 20, 60 by chains, gears, cables, belts, or other suitable mechanical power transmission equipment.

Figure 6:
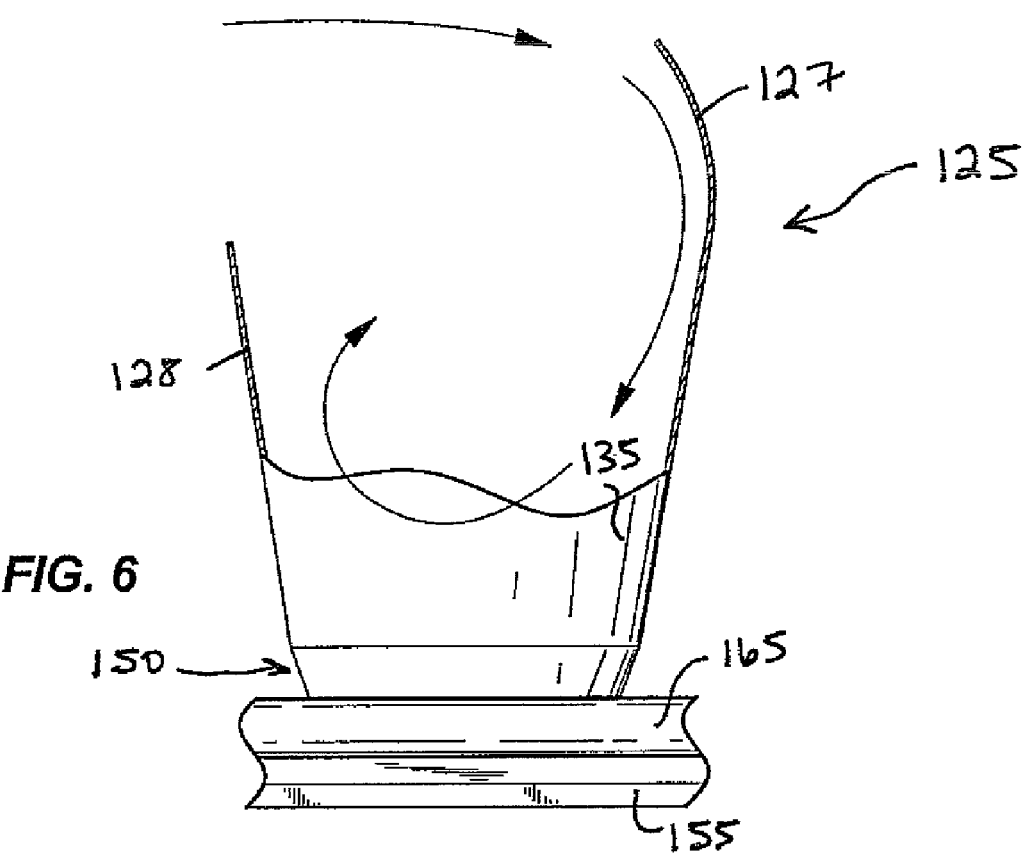
FIG. 6 is a partial cross-sectional side view of a reservoir according to another embodiment of the present invention.

FIGS. 6-8 illustrate alternative embodiments of a carcass cleaning system according to the present invention. Accordingly, with the exception of mutually inconsistent features and elements between the embodiments of FIGS. 6-8 and the embodiments described and/or illustrated in connection with FIGS. 1-5, reference is hereby made to the description above accompanying the embodiment of FIGS. 1-5 for a more complete description of the features and elements (and the alternatives to the features and elements) of the embodiments of FIGS. 6-8. Features and elements in the embodiments of FIGS. 6-8 corresponding to features and elements in the embodiments of FIGS. 1-5 are numbered in the one hundred series of reference numbers (e.g., 10 becomes 110 and the like).

The reservoir 125 shown in FIGS. 6-8 has a shape adapted to be propelled by fluid entering the reservoir 125. The reservoir 125 can have any of the general shapes described above, and further includes a first wall 127 that is raised with respect to (i.e., is higher than) an opposite wall 128. In such embodiments, the reservoir 125 is shaped such that the fluid 135 entering the reservoir 125 can be directed at the first wall 127 to propel the reservoir 125 along the second conveyor 160. Accordingly, the second conveyor 160 can act as a water wheel, since it is at least partially driven by the force or speed of the fluid 135 hitting the first wall 127 of each reservoir 125. In some of these water wheel embodiments, the second conveyor 160 is further driven by power source, in which cases the fluid force is a supplemental driving force to propel the second conveyor 160.

In any of the carcass cleaning system embodiments described herein, the second conveyor 60 can travel any of a variety of travel paths 30. For example, the travel path 30 illustrated in FIG. 1 is generally elongated and ovular. Another example of a travel path is shown in FIGS. 7 and 8, and is indicated by reference numeral 130. The travel path 130 shown in FIGS. 7 and 8 is an irregular path such that the reservoirs 125 are brought to a high elevation, are filled, are then brought to a lower elevation for carcass immersion, and are then brought to yet a lower elevation to empty fluid 135 into the sump 175. The creation and loss of potential energy along with the change in mass generated by the introduction and dispense of fluid 135 can further be used to propel the reservoirs 125 along the second conveyor 160.

The reservoirs in the various embodiments described and illustrated herein can be at least partially filled with fluid 35, 135 in a number of different locations along the second conveyor 60, 160. For example, the conduit 70 in the embodiment of FIG. 1-5 supplies fluid 35 to the reservoirs 25 at a location near the end of the second conveyor 60 and at an intermediate elevation of the second conveyor 60 (below the elevation at which carcasses 15 are received within the reservoirs 25), whereas the conduit 170 in the embodiments of FIGS. 1-5 supply fluid 135 to the reservoirs 125 at a location intermediate the ends of the second conveyor 160 and at an elevation higher than that at which carcasses 115 are received within the reservoirs 125.

The location at which fluid 135 is introduced into the reservoirs 125 in FIGS. 7 and 8 can provide an advantage in that the fluid 135 can be directed against first walls 127 to propel the reservoirs 125 along the second conveyor 160 under the additional influence of gravity. In the illustrated embodiments of FIGS. 7 and 8, the fluid 135 is directed vertically downward against the first wall 127, whereas in other embodiments, the fluid 135 can be directed at an angle other than vertically downward against the wall 127 to drive the reservoirs 125 along the second conveyor 160. Still other fill locations and fill angles are possible, and are considered to be within the scope of the present invention.

In some embodiments, such as the embodiment illustrated in FIG. 8, fluid 135 can be sprayed into the reservoirs 125 as the reservoirs 125 are tipped or otherwise moved to discharge the fluid 135. For example, in the illustrated embodiment of FIG. 8, a nozzle 183 can be included to spray fluid 135 into the reservoirs 125 to wash off any foreign matter not dispensed when the fluid 135 was poured out of the reservoirs 125. The nozzle 183 can be positioned adjacent the reservoirs 125 as the reservoirs 125 move along a portion 185 of the second travel path 130. The nozzle 183 can be connected to a length of conduit that can either be coupled to the conduit 170 supplying fluid 135 to the reservoirs 125, or coupled to a separate fluid source (not shown). These and other embodiments can include a drip tray 187 positioned below and/or substantially surrounding the nozzle 183 to catch fluid 135 that drips out of the reservoirs 125 and/or that is dispensed from the nozzle 183. The drip tray 187 can drain into the sump 175 or a separate tank (e.g., in cases where the fluid sprayed along the portion 185 of the second travel path 130 is different from the fluid 135 used to clean the carcasses 115).

The operation of cleaning a single carcass 15, 115 using a single reservoir 25, 125 will now be described in detail, it being understood that each of the carcasses 15, 115 and reservoirs 25, 125 can operate in substantially the same manner. In operation, the carcass 15, 115 can be coupled to the first conveyor 20, 120 by one or more shackles 40, 140. The first conveyor 20, 120 can be moved along the first travel path 37, 137 by any of the previously-discussed power sources. The reservoir 25, 125 is coupled to the second conveyor 60, 160, and is moved along the second travel path 30, 130. The reservoir 25, 125 is at least partially filled with fluid 35, 135 from a conduit outlet 72, 172. Then, the carcass 15, 115 is at least partially inserted into the reservoir 25, 125 and is at least partially submerged in the fluid 35, 135, while both the carcass 15, 115 and the reservoir 25, 125 continue to move. Alternatively, the carcass 15, 115 can be inserted into the reservoir 25, 125 before or while the reservoir is being filled. The carcass 15, 115 is then removed from the reservoir 25, 125, and is moved further along the first conveyor 20, 120. The fluid 35, 135 from the reservoir 25, 125 is poured into the sump 75, 175. The fluid 35, 135 in the sump 75, 175 can be filtered and re-used if desired. In some embodiments, the reservoir 25, 125 can follow the second conveyor 60, 160 back toward the conduit outlet 72, 172, and one or more nozzles 183 can spray fluid into the reservoir 125 (e.g., in an inverted position) to remove foreign matter. The fluid 35, 135 can be collected in a sump 75, 175. Also, the reservoir 25, 125 can repeat the cycle just described, whereas the carcass 15, 115 can travel along the first conveyor 20, 120 to undergo further cleaning and/or cooling processes.

The embodiments described above and illustrated in the figures are presented by way of example only, and are not intended as a limitation upon the concepts and principles of the present invention. As such, it will be appreciated by one having ordinary skill in the art that various changes in the elements and their configuration and arrangement are possible without departing from the spirit and scope of the present invention as set fort in the appended claims.

For example, the fluid 35, 135 used in the various carcass cleaning systems 10, 110 illustrated and/or described herein can be room temperature or warmer. In some embodiments, warm or hot fluid can be desirable in order to assist in eliminating bacteria and dissolving or removing viscera remains and/or fecal matter. In other embodiments, however, the carcass cleaning system 10, 110 can at least partially define a chiller processing stage, whereby the immersion of carcasses 15, 115 within the fluid in the reservoirs 25, 125 lowers the temperature of the carcasses 15, 115. In any case, any of the carcass cleaning systems 10, 110 described and/or illustrated herein can be operated at any speed desired, such as to provide a carcass immersion time of under one minute to as much as an hour or more in some embodiments. It will be appreciated, however, that the immersion time for on-line reprocessing can be relatively short when compared to the immersion time for chiller processing.

As another example, a heat exchanger can be included in any of the carcass cleaning systems 10, 110 described and/or illustrated herein, such that the carcass cleaning system 10, 110 can be used simultaneously as both an on-line reprocessing stage and a chiller processing stage. In such embodiments, the immersion time can be, for example, about an hour. In other combined-operation embodiments, the immersion time can be more or less than an hour.

Various features and advantages of the invention are set forth in the following claims.

What is claimed is:

1. A carcass cleaning apparatus, comprising:
a first conveyor movable to transport carcasses;
a plurality of fluid reservoirs each shaped to retain a quantity of fluid; and
a second conveyor movable to transport the plurality of reservoirs,
wherein the first and second conveyors are movable with respect to one another to at least partially immerse a different carcass conveyed by the first conveyor into each reservoir moved by the second conveyor, and to remove the carcass from the reservoir moved by the second conveyor.

2. The carcass cleaning apparatus of claim 1, further comprising a quantity of fluid positioned in at least one of the plurality of fluid reservoirs, the quantity of fluid sufficient to at least partially immerse at least one of the carcasses.

3. The carcass cleaning apparatus of claim 2, further comprising a sump positioned proximate the second conveyor to receive the quantity of fluid after the carcass is removed the from the reservoir.

4. The carcass cleaning apparatus of claim 3, further comprising a fluid line positioned to fill the plurality of fluid reservoirs.

5. The carcass cleaning apparatus of claim 4, further comprising a conduit fluidly coupling the sump and the fluid line to provide fluid to the fluid line from the sump.

6. The carcass cleaning apparatus of claim 5, further comprising a filter positioned in one of the sump and the conduit to filter the fluid.

7. The carcass cleaning apparatus of claim 1, wherein the first and second conveyors move together when the carcass is at least partially immersed into the respective reservoir.

8. A carcass cleaning system, comprising:
- a plurality of reservoirs each shaped to retain a quantity of fluid;
- a conveyor coupled to the plurality of reservoirs and movable to transport the plurality of reservoirs along a path;
- a fluid line positioned to fill the plurality of reservoirs in at least one location along the path; and
- a quantity of fluid positioned in at least one of the plurality of fluid reservoirs, the quantity of fluid sufficient to at least partially fill the at least one of the plurality of fluid reservoirs,
- wherein the at least one of the plurality of reservoirs has a first state in which the reservoir retains the quantity of fluid within which at least one carcass is received, and a second state in which the reservoir is substantially drained of fluid.

9. The carcass cleaning system of claim 8, further comprising a second conveyor operable to retain a plurality of carcasses, 10. The carcass cleaning system of claim 9 wherein the conveyor and the second conveyor are movable with respect to one another to at least partially immerse a different carcass conveyed by the second conveyor into each reservoir moved by the conveyor, and to remove the different carcass from the reservoir moved by the second conveyor.

11. The carcass cleaning system of claim 10, wherein the carcass is retained on the second conveyor when the carcass is at least partially immersed into the respective reservoir and when the carcass is removed from the reservoir.

12. The carcass cleaning system of claim 9, wherein the second conveyor moves with to the conveyor along at least a portion of travel of the conveyor and the second conveyor.

13. The carcass cleaning system of claim 8, further comprising a sump positioned proximate the conveyor to receive the quantity of fluid after the carcass is removed the from the reservoir.

14. The carcass cleaning system of claim 13, further comprising a fluid line positioned to fill the plurality of fluid reservoirs with the quantity of fluid.

15. The carcass cleaning system of claim 14, further comprising a conduit fluidly coupling the sump and the fluid line to provide fluid to the fluid line from the sump.

16. The carcass cleaning system of claim 15, further comprising a filter positioned in one of the sump and the conduit to filter the fluid.

17. A method of cleaning carcasses, comprising:
- moving a carcass along a first path;
- moving a reservoir along a second path;
- at least partially filling the reservoir with fluid;
- inserting the carcass into the reservoir;
- removing the carcass from the reservoir;
- retaining the carcass on a conveyor while inserting the carcass into the reservoir and removing the carcass from the reservoir;
- emptying the reservoir of the fluid;
- filtering the fluid to produce a filtered fluid; and
- repeating both moving steps, and the at least partially filling, inserting, removing, retaining, and emptying steps with the filtered fluid for another carcass.

18. The method of claim 17, wherein the step of moving a reservoir along a second path is repeated with a different reservoir.

19. The method of claim 17, wherein the step of partially filling the reservoir with fluid is completed prior to inserting a carcass into the reservoir.

20. The method of claim 17 wherein the step of partially filling the reservoir with fluid is completed after inserting a carcass into the reservoir.

* * * * *